United States Patent
Herington (10) Patent No.: US 8,280,974 B2
(45) Date of Patent: Oct. 2, 2012

(54) MIGRATING WORKLOADS USING NETWORKED ATTACHED MEMORY

(75) Inventor: Daniel Edward Herington, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 742 days.

(21) Appl. No.: 11/831,790

(22) Filed: Jul. 31, 2007

(65) Prior Publication Data

US 2009/0037554 A1 Feb. 5, 2009

(51) Int. Cl.
*G06F 15/167* (2006.01)

(52) U.S. Cl. ........ 709/213; 709/212; 709/214; 709/215; 710/33

(58) Field of Classification Search .......... 709/213, 709/214, 215, 217, 218, 219; 710/33
See application file for complete search history.

(56) References Cited

U.S. PATENT DOCUMENTS

| | | | |
|---|---|---|---|
| 6,615,364 B1 * | 9/2003 | Masuda et al. ............ | 714/5 |
| 7,051,200 B1 * | 5/2006 | Manferdelli et al. ....... | 713/153 |
| 7,149,855 B2 * | 12/2006 | Chen et al. ............... | 711/154 |
| 7,751,556 B2 * | 7/2010 | Sato et al. ................ | 380/28 |
| 2004/0010787 A1 * | 1/2004 | Traut et al. ............... | 718/1 |
| 2004/0158766 A1 * | 8/2004 | Liccione et al. .......... | 714/4 |
| 2005/0268298 A1 * | 12/2005 | Hunt et al. ................ | 718/1 |
| 2006/0075191 A1 * | 4/2006 | Lolayekar et al. ........ | 711/114 |
| 2007/0078988 A1 * | 4/2007 | Miloushev et al. ....... | 709/227 |
| 2007/0180436 A1 * | 8/2007 | Travostino et al. ....... | 717/138 |
| 2007/0208799 A1 * | 9/2007 | Hughes .................... | 709/203 |
| 2007/0220121 A1 * | 9/2007 | Suwarna ................... | 709/220 |
| 2008/0270564 A1 * | 10/2008 | Rangegowda et al. .... | 709/212 |
| 2009/0142125 A1 * | 6/2009 | Henrikson ................ | 401/129 |

OTHER PUBLICATIONS

Bradford et al., LiveWide-Area Migration of Virtual Machines Including Local Persistent State, Jun. 13-15, 2007, ACM, ISBN: 978-1-59593-630-1; pp. 1-11.*

* cited by examiner

*Primary Examiner* — Haresh N Patel
*Assistant Examiner* — Harunur Rashid (57) ABSTRACT

A network system comprising a plurality of servers communicatively-coupled on a network, a network-attached memory coupled between a first server and a second server of the server plurality, and a memory management logic that executes on selected servers of the server plurality and migrates a virtual machine from the first server to the second server with memory for the virtual machine residing on the network-attached memory.

13 Claims, 9 Drawing Sheets

MIGRATING WORKLOADS USING NETWORKED ATTACHED MEMORY

BACKGROUND

Virtual machines can be migrated online by copying memory from one system to another while a virtual machine continues to run. Portions of memory become "dirty" during the copy so the process is repeated until, eventually, the workload and/or virtual machine is stopped so a final copy can be done. Then the workload or virtual machine is started on a secondary server. The amount of downtime depends on how busy the workload is during the move operation.

Workload or application downtime is increasingly considered to be unacceptable. To address such down time, virtualization techniques can be implemented with capabilities that enable moving of workloads and/or virtual machines between servers without the workloads ever visibly or detectably going off-line. Workload migration can be performed by copying the memory footprint of the workload from one system to another system, while the workload continues to run. Multiple copy operations address memory that has changed while being copied. In addition, for a typically small amount of time the workload is stopped to make a final memory copy before the workload can be restarted on the secondary node.

For example, virtual machine migration operations can involve repeated copying of the memory footprint of the virtual machine from one system to another. Once the memory is copied, a check is made to determine whether any memory changed during the copy, and the changes are then copied. The process repeats until the amount of memory that becomes "dirty" during the copy is roughly equivalent to the amount of memory that was copied. At this point the workload or virtual machine is "frozen" (sometimes called quiesced or checkpointed) on the primary server, a final copy of dirty memory is done and then the workload is activated or restarted on the secondary server. As long as the time of the last copy is shorter than typical network timeouts, the stopped condition of the workload is not detectable by a user. The workload did stop, but was for a very short period of time. The stoppage time increases based on how busy the workload is at the time of the migration because memory would be changing more rapidly resulting in more "dirty" memory pages in shorter timeframes.

SUMMARY

An embodiment of a network system comprises a plurality of servers communicatively-coupled on a network, a network-attached memory coupled between a first server and a second server of the server plurality, and a memory management logic that executes on selected servers of the server plurality and migrates a virtual machine from the first server to the second server with memory for the virtual machine residing on the network-attached memory.

BRIEF DESCRIPTION OF THE DRAWINGS

Embodiments of the invention relating to both structure and method of operation may best be understood by referring to the following description and accompanying drawings.

DETAILED DESCRIPTION

Systems and methods are described for migrating workloads between systems using network-attached memory devices.

A workload or virtual machine can be migrated using a high-speed network-attached memory device that is connected to two servers. The workload or virtual machine can run on either server and all of the memory for the workload or virtual machine resides on the network-attached memory device. An illustrative process for migration can eliminate the operation of checkpointing and restarting the workload or virtual machine during migration.

In addition, the illustrative structures and/or techniques can be used to form a device connected to multiple systems that can be used as a paging device that is much faster than disk. The device can be shared and therefore used by multiple systems without loading the systems with extra memory is the extra memory is only used for short periods of time. Thus workloads on multiple servers can share a single pool of extra memory. A server can take control of some memory for a short time period and then free the memory for usage by other servers and/or application when the memory is no longer needed, thereby allowing other workloads, potentially on different servers to have similar temporary access to the same physical memory.

Furthermore, the depicted structures and techniques can be used to form a high-performance device for storing information that is used by multiple systems.

The illustrative network systems and associated methods are typically used in combination with virtual machines, workload manager, global workload managers, and the like.

Various embodiments of network systems and associated operating methods introduce a Network Attached Memory (NAM) device and usage of the device in workload or virtual machine migration. The network-attached memory is typically a device used in combination with primary and secondary nodes that may be physically separate from the primary and secondary nodes. The network-attached memory can comprise high speed memory and high speed network interconnects. Each of servers on the primary and secondary nodes is capable of using the network-attached memory as a supplemental form of real memory. The supplemental memory enables moving the memory of a workload from "standard" main memory to the network-attached memory while continuing to run the workload, although memory access can be slower than main memory accesses. The network-attached memory facilitates the move of a virtual machine from one system to another since the workload can be moved from main memory on one system into the network-attached memory (which is attached to both systems) while continuing to run on the primary system as the workload memory is moved. The migration of the workload or virtual machine becomes no more than an instantaneous stop of the workload on the primary and start of the workload on the secondary—no memory copy is required while the workload is offline.

An additional use for the network-attached memory can be as high-speed shared swap space. Many software products experience serious performance degradation when a system starts paging memory to disk. The illustrative network system and associated techniques enable usage of a device connected to multiple systems that can be used as a paging device that is considerably faster than disk. The device can be shared and therefore be used by multiple systems for short term memory requirements without requiring each of the systems to be loaded with extra memory since multiple systems can share access to the extra memory within the network-attached memory.

Figure 1:
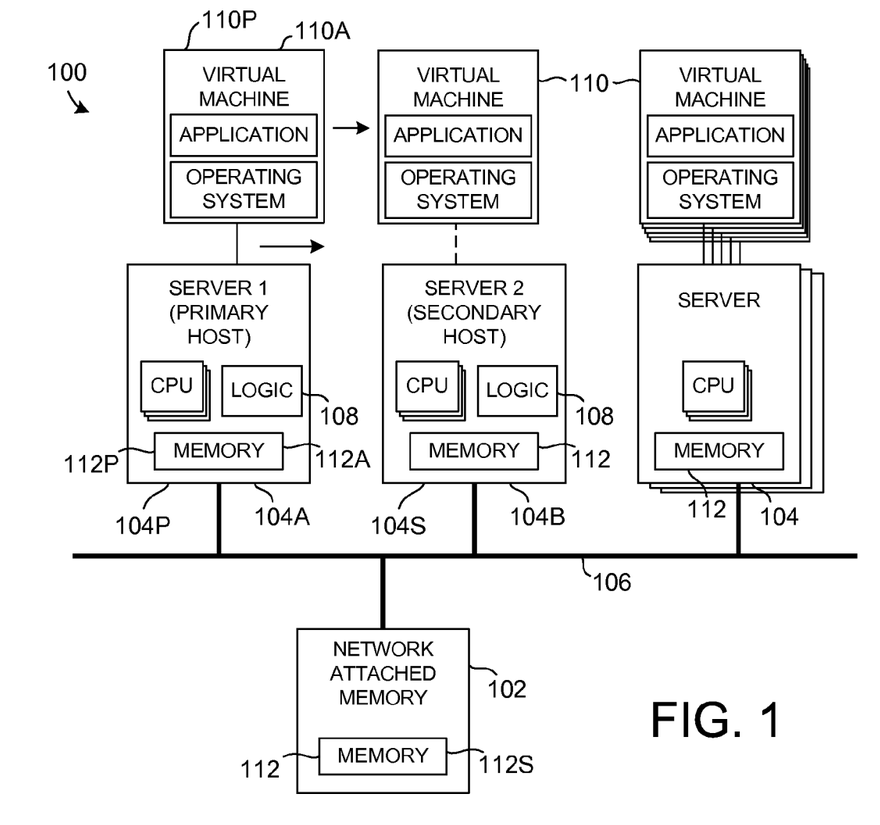
FIG. 1 is a schematic block diagram depicting an embodiment of a network system that can migrate workloads using network-attached memory.

Referring to FIG. 1, a schematic block diagram depicts an embodiment of a network system 100 that can migrate workloads using network-attached memory 102. The illustrative network system 100 comprises multiple servers 104 communicatively-coupled on a network 106 and a network-attached memory 102 coupled between a first server 104A and a second server 104B of the multiple servers 104. A memory management logic 108 that executes on selected servers 104 and migrates a virtual machine 110 from the first server 104A to the second server 104B with memory 112 for the virtual machine 110 residing on the network-attached memory 102.

The memory management logic 108 can run a virtual machine 110 on either the first server 104A or the second server 104B with all memory 112 for the virtual machine 110 residing on the network-attached memory 102.

In one example operation, the memory management logic 108 can migrate a virtual machine 110A executing on the first server 104A to the second server 104B by moving a workload of the executing virtual machine 110A from main memory 112A on the first server 104A into the network-attached memory 102, and continuing to execute the virtual machine 110A on the first server 104A while the workload is moved.

In contrast to a migration scheme based on a repeated copy of memory from one system to another, the illustrative network system 100 performs a move of the memory rather than a copy. A process using main memory on the primary host 104P moves accesses to network-attached memory 102, while the process continues to run on the primary 104P, then the workload is instantaneously stopped on the primary 104P and started on the secondary 104S. The transition from primary 104P to secondary 104S is instantaneous on the basis that no memory copy is takes place to attain the transition. Memory accesses for the process are then moved from the shared network-attached memory 102 to main memory on the secondary 104S.

The illustrative network system 100 enables workload or virtual machine migration without copying memory as the memory is actively on the primary system. The network system 100 also eliminates downtime while the workload or virtual machine is moved.

In comparison to a copy operation, for a move operation subsequent accesses of the memory are in the new location. Once a memory block is moved, when the process accesses the memory the access is automatically pointed to the new location. With a copy, the process continues to use the memory in the original location even after the copy to the new location. The new location is not used until after the process has been stopped on the old system and a new process has been started on the new system.

In another example operation, the memory management logic 108 can migrate a virtual machine 110A executing on the first server 104A to the second server 104B by sharing the network-attached memory 102 between the first server 104A and the second server 104B, executing the virtual machine 110A on the first server 104A, and instantaneously terminating virtual machine execution on the first server 104A and commencing virtual machine execution on the second server 104B.

In another embodiment, the servers 104 can include a primary 104P and a secondary 104S. The memory management logic 108 can move data for a virtual machine 110A executing on the primary 104P from the primary 104P to the network-attached memory 102 while continuing execution, terminates execution of the virtual machine 110P on the primary 104P and commences execution of the virtual machine 110A on the secondary 104S instantaneously. The memory management logic 108 moves the data from the executing virtual machine 110A from the network-attached memory 102 to the secondary 104S.

The memory management logic 108 can be implemented to enable the servers 104 to use the network-attached memory 102 as secondary memory 112S that supplements primary memory 112P of the servers whereby data for a workload can be moved from the primary memory 112P to the secondary memory 112S during execution of the workload.

In various embodiments, the network-attached memory 102 can function as a paging device for the servers 104 at storage access speeds that are faster than disk access speed.

The network-attached memory device can thus also supply extra memory that may be used by servers for short periods of time, reducing or eliminating over-provisioning of memory because the extra memory can be placed in a shared pool and used by multiple servers.

Figure 2:
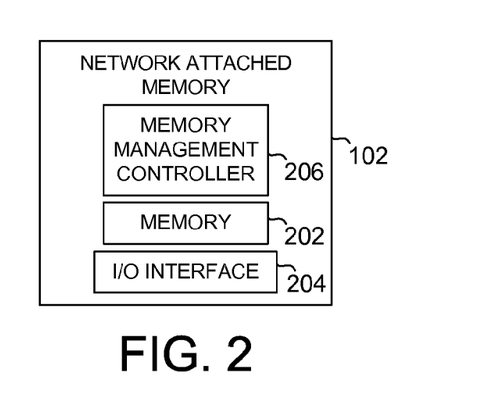
FIG. 2 is a schematic block diagram showing an example embodiment of a suitable network-attached memory that can be used for migrating workloads between systems.

Referring to FIG. 2, a schematic block diagram illustrates an example embodiment of a suitable network-attached memory 102 that can be used for migrating workloads between systems. The network-attached memory 102 comprises a memory 202, an input/output interface 204 for high-speed and low-latency communication of 10 gigabit Ethernet or faster, and a memory management controller 206.

The network-attached memory 102 is physically separate from the first server 104A and the second server 104B and comprises a high-speed memory 202 and high-speed network interconnects 204 wherein the network-attached memory 102 communicates with the servers 104 at speeds of at least 10 gigabit Ethernet.

Figure 3A:
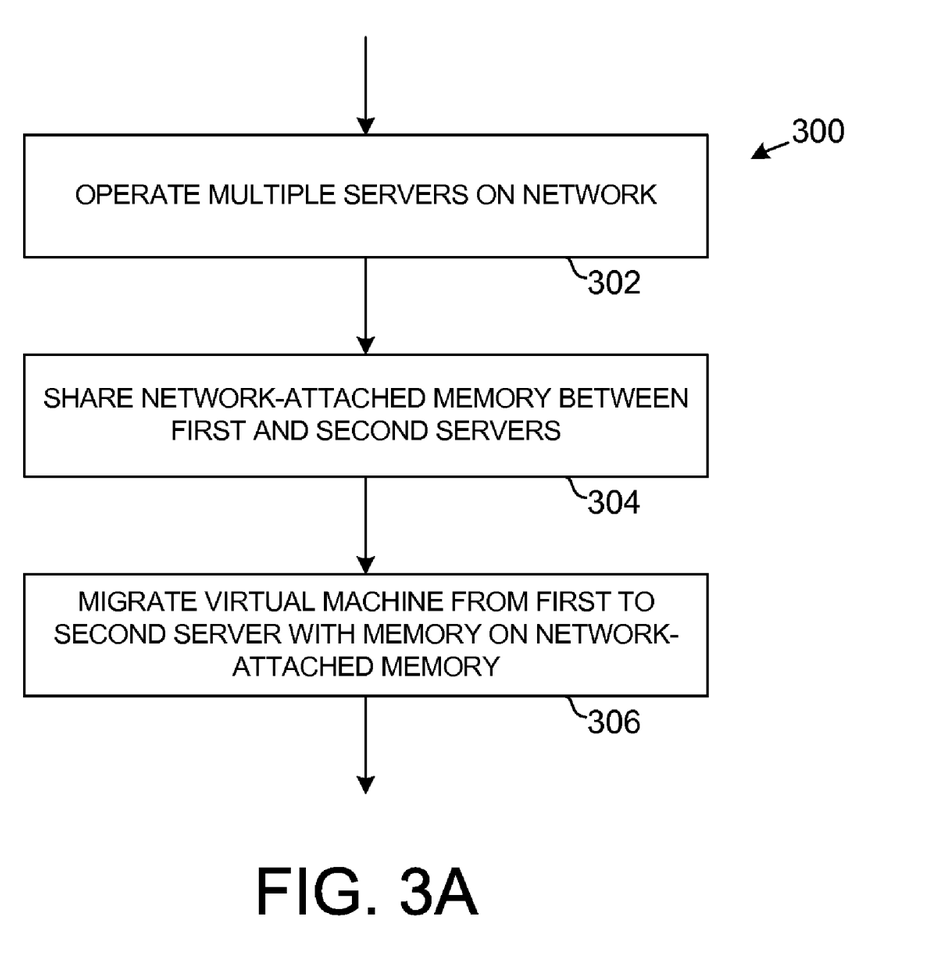
FIGS. 3A through 3G are multiple flow charts illustrating one or more embodiments or aspects of a method for migrating workloads between systems using network-attached memory devices.

Referring to FIGS. 3A through 3G, multiple flow charts illustrate one or more embodiments or aspects of a method for migrating workloads between systems using network-attached memory devices. As shown in FIG. 3A. An illustrative network management method 300 comprises operating 302 multiple servers which are communicatively-coupled on a network. A network-attached memory is shared 304 between a first server and a second server of the multiple servers. A virtual machine can be migrated 306 from the first server to the second server with memory for the virtual machine residing on the network-attached memory.

In some embodiments, a virtual machine can be run on either the first server or the second server with all memory for the virtual machine residing on the network-attached memory.

Figure 3B:
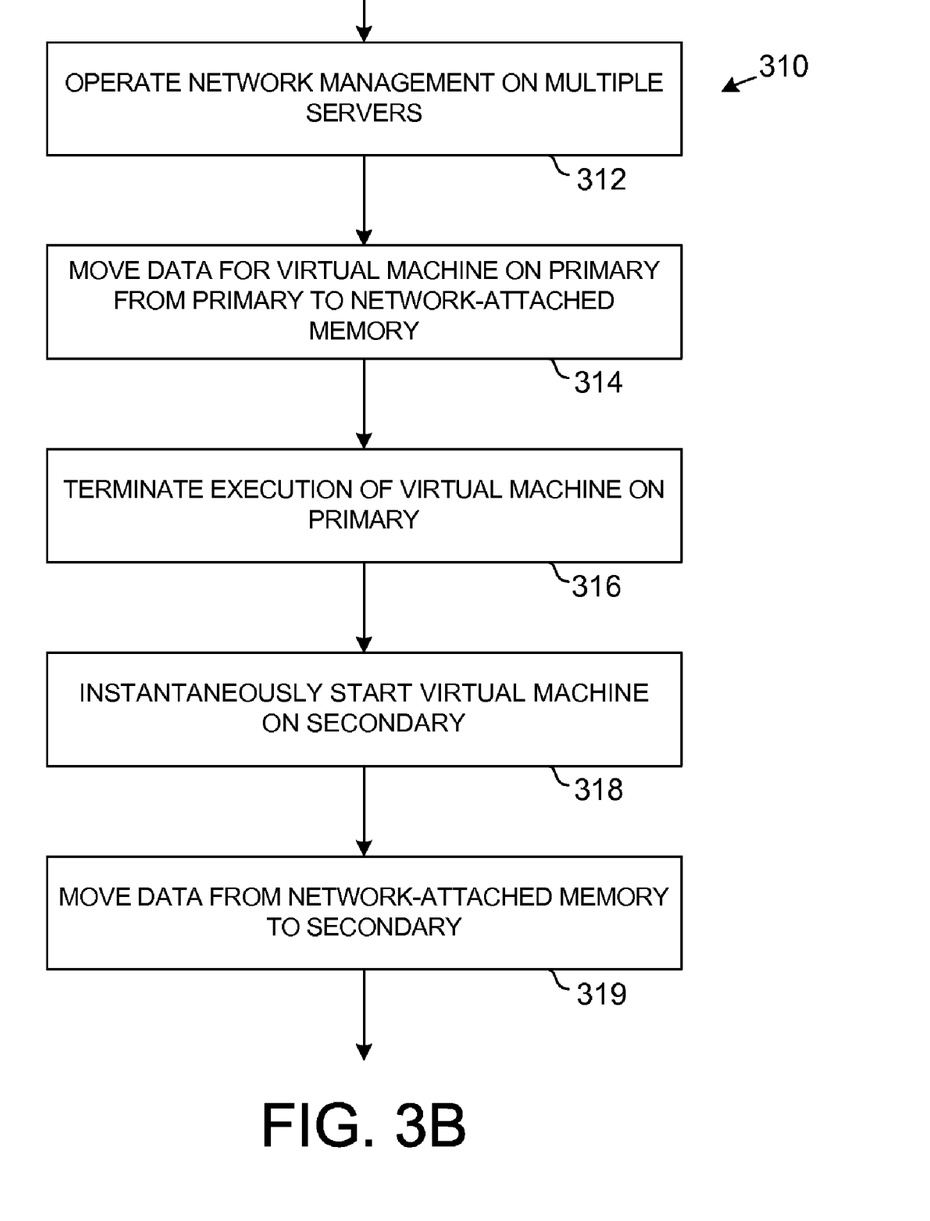

Referring to FIG. 3B, an embodiment of a network management method 310 operates 312 on multiple servers including a primary and a secondary. The network management method 310 comprises moving 314 data for a virtual machine executing on the primary from the primary to the network-attached memory while continuing execution. Execution of the virtual machine on the primary is terminated 316 and instantaneously commenced 318 on the secondary. Data is moved 319 from the executing virtual machine from the network-attached memory to the secondary.

Figure 3C:
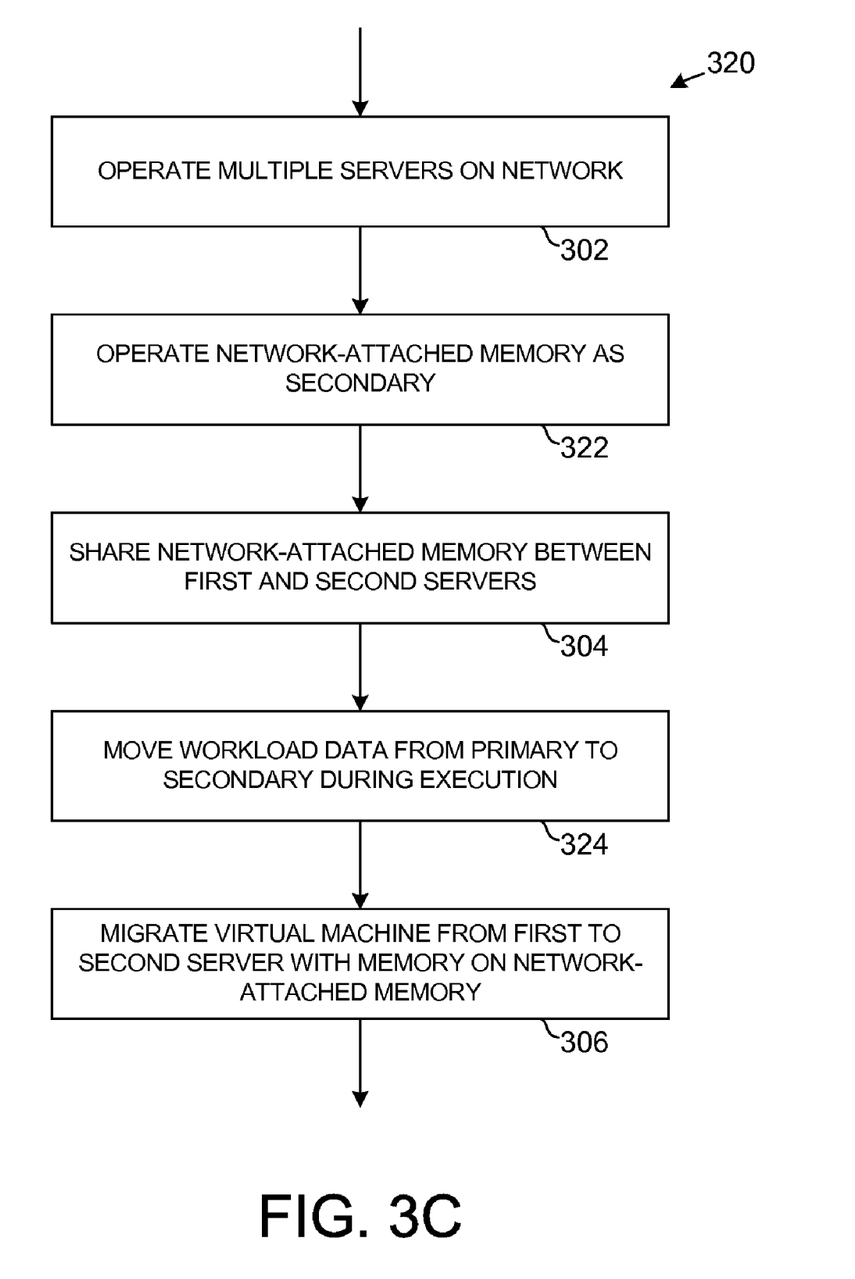

Referring to FIG. 3C, an embodiment of a network management method 320 can further comprise operating 322 the network-attached memory as secondary memory that supplements primary memory of the servers. Data for a workload can be moved 324 from the primary memory to the secondary memory during workload execution.

Figure 3D:
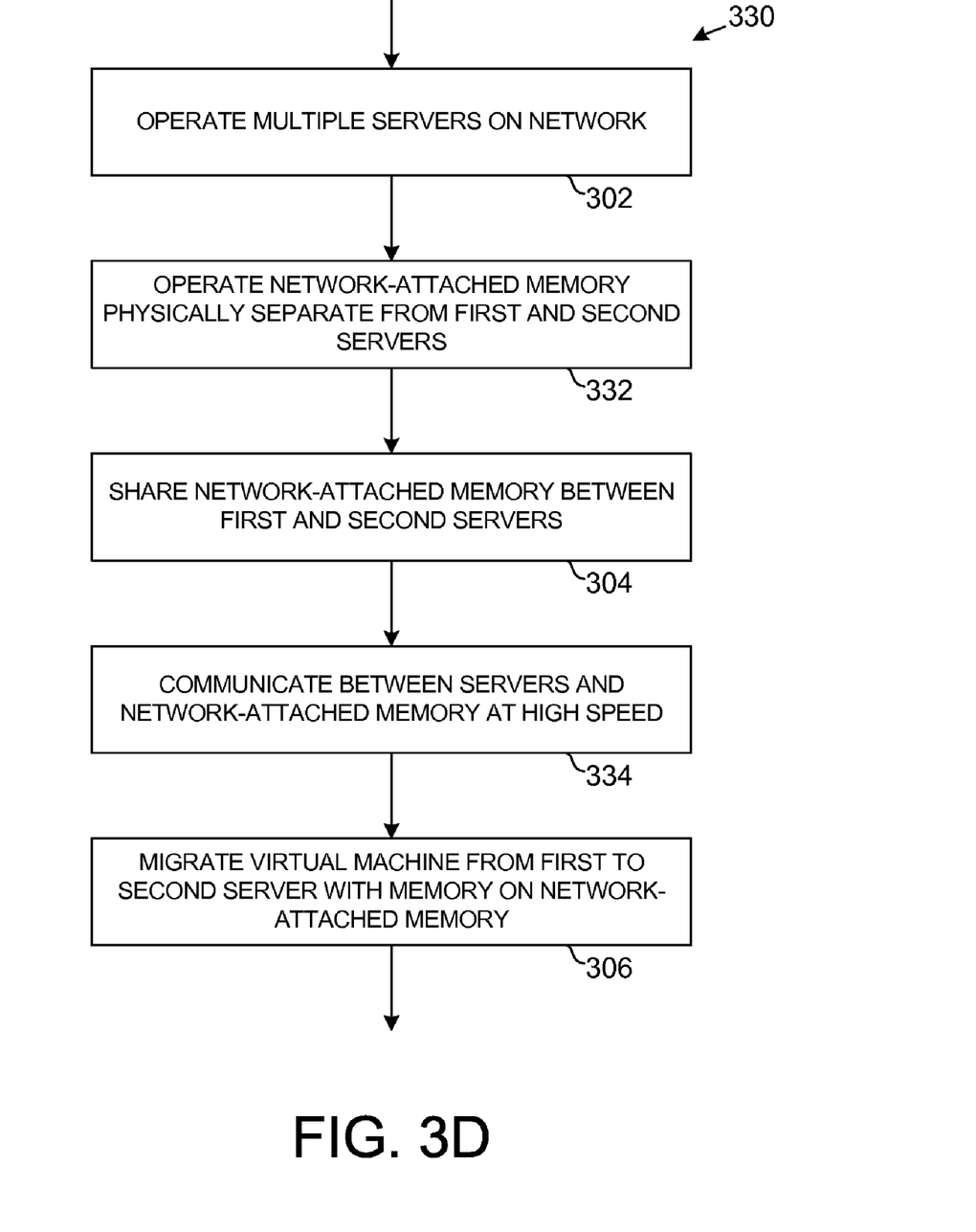

Referring to FIG. 3D, an embodiment of a network management method 330 can further comprise operating 332 a network-attached memory that is physically separate from the first server and the second server and comprises a high-speed memory and high-speed network interconnects. Communication 334 among the network-attached memory and the servers is performed at speeds of at least 10 gigabit Ethernet.

Figure 3E:
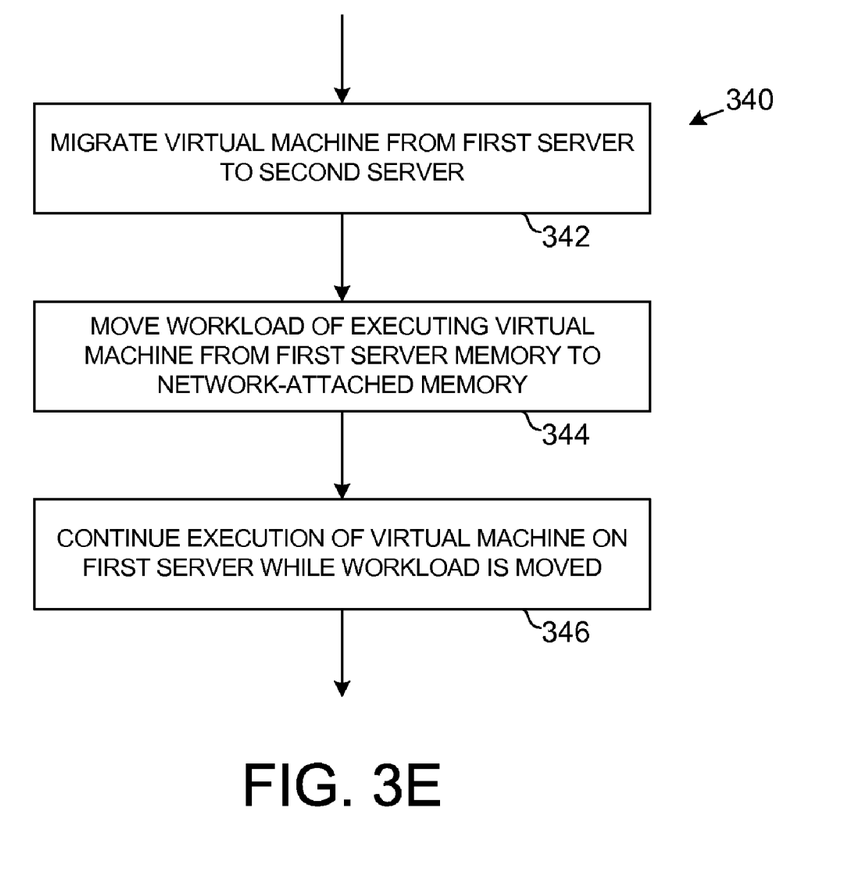

As shown in FIG. 3E, an embodiment of a network management method 340 for migrating 342 a virtual machine executing on the first server to the second server can comprise moving 344 a workload of the executing virtual machine from main memory on the first server into the network-attached memory. Execution of the virtual machine is continued 346 on the first server while the workload is moved.

Figure 3F:
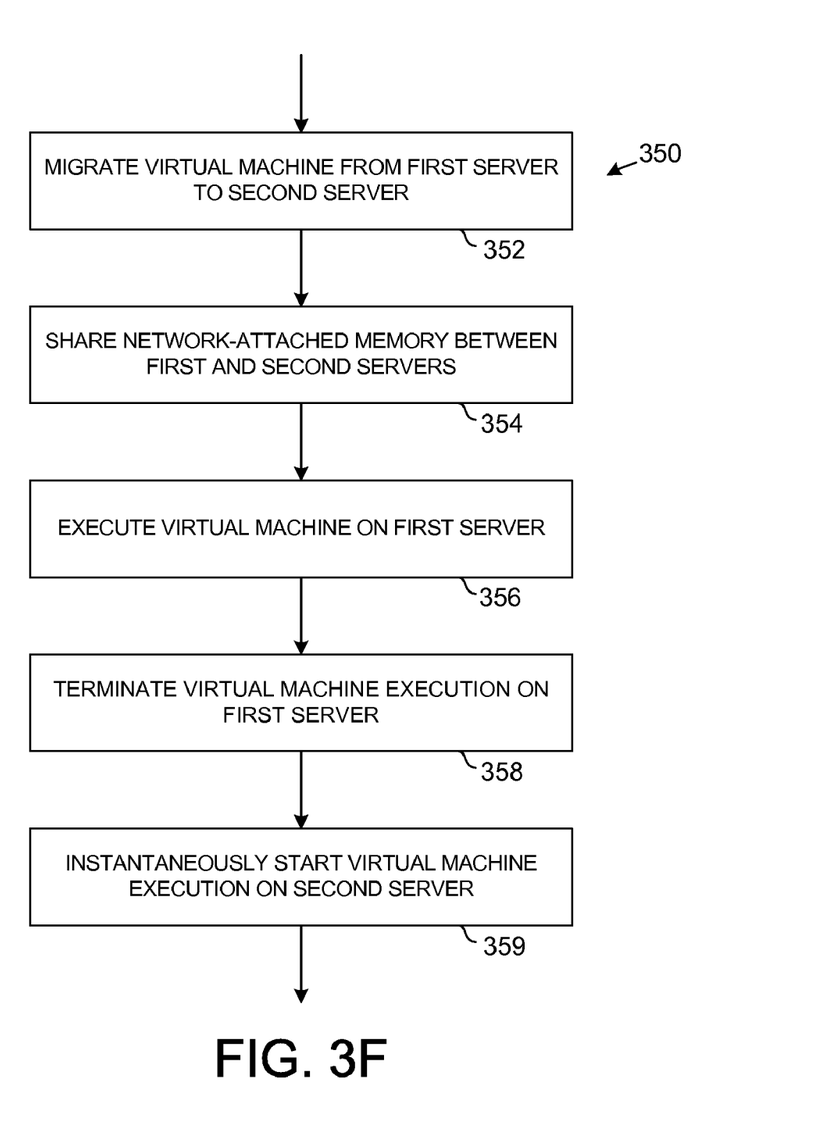

As shown in FIG. 3F, an embodiment of a network management method 350 for migrating 352 a virtual machine executing on the first server to the second server can comprise sharing 354 the network-attached memory between the first server and the second server and executing 356 the virtual machine on the first server. The method 350 further comprises instantaneously terminating 358 virtual machine execution on the first server and commencing 359 virtual machine execution on the second server.

Figure 3G:
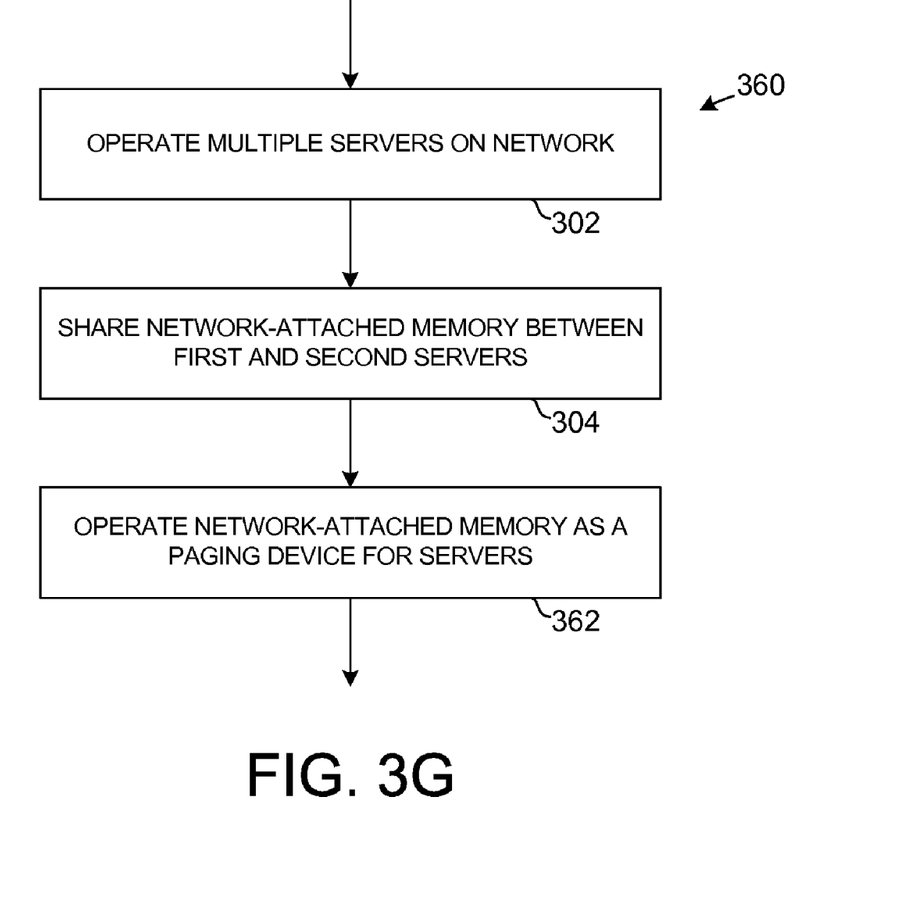

Referring to FIG. 3G, an embodiment of a network management method 360 can further comprise operating 362 the network-attached memory as a paging device for the server plurality at a storage access speed that is faster than disk access speed.

Figure 4:
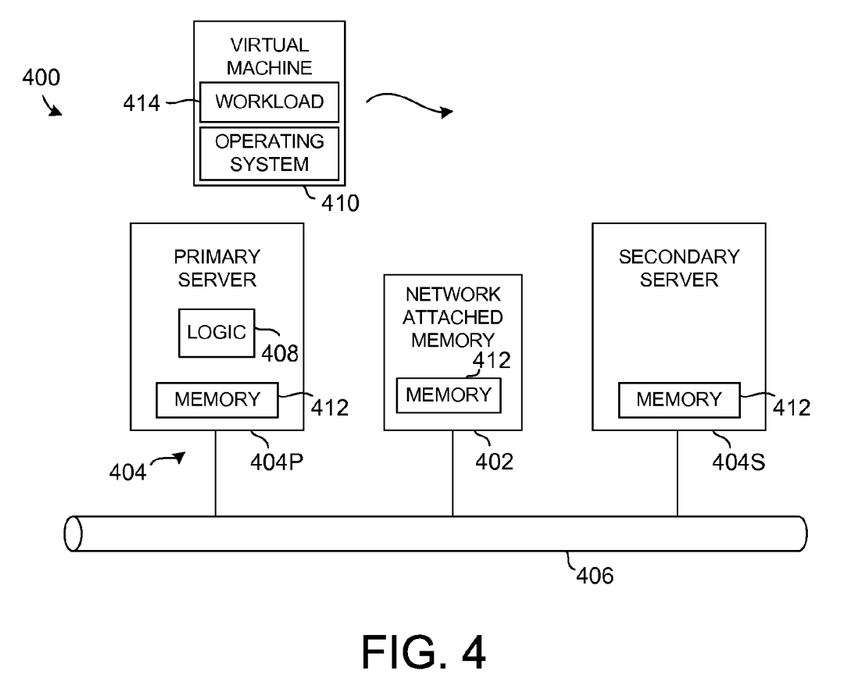
FIG. 4 is a schematic block diagram showing another embodiment of a network system that can migrate workloads using network-attached memory.

Referring to FIG. 4, a schematic block diagram shows another embodiment of a network system 400 that can migrate workloads using network-attached memory 402. The illustrative network system 400 comprises multiple servers 404 including a primary 404P and a secondary 404S and a network-attached memory 402 connected on a network 406 in which the network-attached memory 402 is physically distinct from the primary 404P and the secondary 404S. A memory management logic 408 moves data for a virtual machine 410 executing on the primary 404P from the primary 404P to the network-attached memory 402 while continuing execution. The memory management logic 408 terminates execution of the virtual machine on the primary and commences execution of the virtual machine on the secondary instantaneously, and moves the data from the executing virtual machine 410 from the network-attached memory 402 to the secondary 404S.

In some embodiments, the memory management logic 408 migrates a virtual machine 410 executing on the primary 404P to the secondary 404S by moving a workload 414 of the executing virtual machine 410 from main memory 412 on the primary 404P into the network-attached memory 402, continuing to execute the virtual machine 410 on the primary 404P while the workload 412 is moved, and instantaneously terminating virtual machine execution on the primary 404P and commencing virtual machine execution on the secondary 404S.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like. For example, the block diagrams and flow charts illustrate operations of an article of manufacture comprising a controller-usable medium having a computer readable program code embodied therein for managing a network. The computer readable program code comprises code causing the controller to operate a plurality of servers communicatively-coupled on a network and code adapted to cause the controller to share a network-attached memory between a first server and a second server of the server plurality. The computer readable program code further comprises code causing the controller to migrate a virtual machine from the first server to the second server with memory for the virtual machine residing on the network-attached memory.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method comprising:
    changing workload data while stored in a first memory by processes executing on a first server having a first CPU;
    moving said workload data to or from said first memory from or to, respectively, a second memory;
    changing said workload data while stored in said second memory by processes executing on said first server;
    changing said workload data while stored in said second memory by processes executing on a second server having a second CPU but not said first CPU; and
    removing said workload data from said second memory to a third memory while said workload data is being changed by processes executing on said second server, said moving involving moving said workload data from said first memory to said second memory, said moving occurring while said workload data is changed by processes executing on said first server.

2. A method as recited in claim 1 wherein:
    said moving involves directing memory accesses to said second memory that would have been directed to said first memory before said moving; and
    said removing involves directing memory accesses to said third memory that would have been directed to said second memory before said removing.

3. A method as recited in claim 2 wherein said second memory is network-attached memory attached to said first and second servers via a network.

4. A method as recited in claim 3 wherein said network-attached memory is to serve as a paging device for said first and second servers.

5. A method as recited in claim 2 wherein said processes are virtual-machine processes, and said directings are performed by memory managers of said first and second servers.

6. A computer product comprising non-transitory computer-readable storage media encoded with code to, when executed by one or more CPUs:
    change workload data while stored in a first memory by executing processes on a first server having a first CPU;
    move said workload data to or from said first memory from or to, respectively, a second memory;
    change said workload data while stored in said second memory by executing processes on said first server;
    change said workload data while stored in said second memory by executing processes on a second server having a second CPU but not said first CPU; and
    remove said workload data from said second memory to a third memory while said workload data is being changed by processes executing on said second server, the moving involving moving said workload data from said first memory to said second memory, said moving occurring while said workload data is being changed by processes executing on said first server.

7. A computer product as recited in claim 6 wherein:
    the moving involves directing to said second memory memory accesses that would have been directed to said first memory before said moving; and
    the removing involves directing to said third memory memory accesses that would have been directed to said second memory before said removing.

8. A computer product as recited in claim 6 wherein said second memory is network-attached memory attached to said first and second servers via a network.

9. A computer product as recited in claim 8 wherein said network-attached memory is to serve as a paging device for said first and second servers.

10. A computer product as recited in claim 6 wherein said processes are virtual-machine processes, and said directings are performed by memory managers of said first and second servers.

11. A system comprising:
    a first server having a first memory and a first CPU;
    a second server having a second memory and a second CPU;
    a network;
    network-attached memory communicatively coupled to said first and second servers via said network, said network-attached memory being to serve as a paging device for said first and second servers; and
    a workload manager to migrate workload data from said first server to said second server by:
        changing workload data while stored in said first memory by processes executing on said first server having said first CPU;
        moving said workload data to or from said first memory from or to, respectively, said network-attached memory;
        changing said workload data while stored in said network-attached memory by processes executing on said first server;
        changing said workload data while stored in said network-attached memory by processes executing on said second server having said second CPU but not said first CPU; and
        removing said workload data from said network-attached memory to said second memory while said workload data is being changed by processes executing on said second server, said moving involving moving said workload data from said first memory to said network-attached memory, said moving occurring while said workload data is changed by processes executing on said first server.

12. A system as recited in claim 11 wherein:
    said first server has first memory management logic for directing memory accesses by said first processes to said first memory before said moving and for directing memory accesses by said first processes to said network-attached memory during said moving; and
    said second server has second memory management logic for directing memory accesses by said first second processes to said network-attached memory before said removing and for directing memory accesses by said second processes to said second memory during said removing.

13. A system as recited in claim 12 wherein said first and second processes are virtual-machine processes.

* * * * *

UNITED STATES PATENT AND TRADEMARK OFFICE
CERTIFICATE OF CORRECTION

PATENT NO. : 8,280,974 B2
APPLICATION NO. : 11/831790
DATED : October 2, 2012
INVENTOR(S) : Daniel Edward Herington It is certified that error appears in the above-identified patent and that said Letters Patent is hereby corrected as shown below:

In the Claims

In column 7, line 40, in Claim 7, before "accesses" delete "memory".

In column 7, line 43, in Claim 7, before "accesses" delete "memory".

In column 8, line 42, in Claim 12, delete "first second" and insert -- first and second --, therefor.

Signed and Sealed this
Fifteenth Day of October, 2013

Teresa Stanek Rea
*Deputy Director of the United States Patent and Trademark Office*